(12) United States Patent
Maiorano

(10) Patent No.: US 6,188,200 B1
(45) Date of Patent: *Feb. 13, 2001

(54) POWER SUPPLY SYSTEM FOR SUMP PUMP

(75) Inventor: Thomas Maiorano, Brewster, NY (US)

(73) Assignee: Alternate Energy Concepts, Inc., Brewster, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/162,293

(22) Filed: Sep. 28, 1998

Related U.S. Application Data

(63) Continuation of application No. 08/906,580, filed on Aug. 5, 1997.

(51) Int. Cl.[7] ........................................................ H02J 7/00
(52) U.S. Cl. .............................................. 320/132; 361/79
(58) Field of Search ................................. 307/66; 341/32, 341/164; 318/41; 361/79; 320/132

(56) References Cited

U.S. PATENT DOCUMENTS

| | | | |
|---|---|---|---|
| 4,672,520 | * 6/1987 | Ueda et al. | 363/37 |
| 4,673,826 | * 6/1987 | Masson | 307/66 |
| 4,709,318 | * 11/1987 | Gephart et al. | 363/37 |
| 5,076,763 | * 12/1991 | Anastos et al. | 417/12 |
| 5,234,319 | * 8/1993 | Wilder | 417/40 |
| 5,616,968 | * 4/1997 | Fujii et al. | 307/66 |

* cited by examiner

*Primary Examiner*—Peter S. Wong
*Assistant Examiner*—Pia Tibbits
(74) *Attorney, Agent, or Firm*—Cooper & Dunham LLP

(57) ABSTRACT

A power supply system for a sump pump including a transformerless inverter circuit with a plurality of MOSFET transistors for powering the pump using either available utility-supplied power or stored power from a battery.

21 Claims, 3 Drawing Sheets

POWER SUPPLY SYSTEM FOR SUMP PUMP

This application is a continuation of application Ser. No. 08/906,580 filed Aug. 5, 1997.

BACKGROUND

1. Field of the Invention

The instant invention relates to a power supply system for a pump. More particularly, the instant invention relates to a power supply system for powering a sump pump using either available utility-supplied power or stored power from a battery.

2. Description of the Prior Art

Backup battery power supply systems are known for use with basement sump pumps. One such backup battery power supply is included with the "Basement Sentry Series" line of backup sump pump systems sold by Zoeller Pump Co. This line of backup sump pump systems utilizes a dedicated 12-volt auxiliary pump to supplement the main pump in the event that it cannot operate due to a loss of power or other malfunction. The 12-volt auxiliary pump is powered by a backup battery power supply that provides the required current at 12 volts. FIG. 1 depicts a schematic diagram of this type of system. As seen in FIG. 1, main sump pump 1 is a 110–120 volt pump that receives power from AC receptacle 3. Backup sump pump 5 is a 12 volt pump that receives 12 volt DC power from controller 7a and battery 7b. Transformer 9, which receives AC power from AC receptacle 11, provides DC power to controller 7a to charge battery 7b.

Other similar 12 volt auxiliary pump systems are sold by Simer, Flotec, and Basement Watchdog Special.

A deficiency of all of these 12 volt systems is that due to the relatively low voltage supplied to the sump pump from the battery, a relatively high current is required in order to apply a substantial amount of power to the pump. The transmission of a high current through a medium such as a battery cable is inherently inefficient. Thus, these 12 volt systems do not optimize the use of the stored battery energy in terms of gallons of water that can be pumped in a given time and/or total length of time of pump operation.

Another backup sump pump system is the Sumpro system. While this system utilizes a power inverter to provide 115 volt alternating current to a sump pump from a battery, it is believed that the inverter uses a transformer configuration, which is relatively inefficient. Additionally, the Sumpro system uses a metal enclosure, which is prone to rust in the damp environment in which sump pumps are used. Further, such a metal enclosure may present a potential safety hazard in the event of an internal wiring malfunction resulting in the enclosure being raised to a high voltage state.

SUMMARY OF THE INVENTION

It is therefore an object of the present invention to provide an efficient power supply system for powering a high-voltage pump using either available utility-supplied power or stored power from a battery.

It is another object of the present invention to provide an efficient MOSFET power supply system utilizing a transformerless inverter circuit for maximum energy efficiency.

It is another object of the present invention to provide an efficient power supply system utilizing an enclosure that eliminates rust and maximizes safety to the user.

According to one aspect of the present invention a system for selectively providing alternating current power to a pump from an electric utility connection and from a battery is provided, including a receiving element for receiving power from the electric utility connection, a charging circuit connected to the battery and the receiving element for charging the battery with power from the electric utility connection and for maintaining the battery in a fully charged state, and an inverter circuit connected to the battery for outputting alternating current at an inverter output.

The inverter circuit is a transformerless circuit including a number of power MOSFET transistors and a conversion relay is connected to the inverter output and the electric utility connection for supplying power to the pump from either the inverter circuit or the electric utility connection to a main output.

These and other advantages will become apparent from the detailed description accompanying the claims and attached drawing figures.

DETAILED DESCRIPTION OF THE PREFERRED EMBODIMENTS

According to one aspect of the present invention a system for selectively providing alternating current power to a pump from either an electric utility connection or from a battery is provided, including a receiving element for receiving power from the electric utility connection, a charging circuit connected to the battery and the receiving element for charging the battery with power from the electric utility connection and for maintaining the battery in a fully charged state, and an inverter circuit connected to the battery for outputting alternating current at an inverter output.

The inverter circuit is a transformerless circuit including a number of power MOSFET transistors and a conversion relay is connected to the inverter output and the electric utility connection for supplying power to the pump from either the inverter circuit or the electric utility connection to a main output.

The power MOSFET transistors of the inverter circuit may be in a full bridge configuration. The alternating current power output by the inverter circuit may have a period of about 60 Hz, an RMS voltage of about 115 volts RMS, and a peak-to-peak voltage of about 145 volts. The alternating current output at the inverter output of the inverter circuit may be a modified sine wave.

The charging circuit may provide power to the battery at about 12 volts to maintain the battery in the fully charged state. The charging circuit may provide power to the battery at a peak current of about 10 amps and may monitor the battery to maintain the fully charged state by applying power thereto.

The main output may include at least one AC receptacle and the system may further include at least one of a battery condition meter to indicate the present voltage of the battery, a first ammeter to indicate the present current draw from the inverter output, and a second ammeter to indicate the present current draw by the battery from the charging means.

Moreover, the system may further include a timer connected to the conversion relay for selectively modifying a charging rate of the battery between a full charge mode for mass replenishment of the battery and a trickle charge mode for maintenance of the battery.

In addition, the system may further include an enclosure formed from a material that is substantially non-conductive, such as plastic.

To these and other ends, the present invention contemplates a power supply for a sump pump which operates on either standard household electricity or on battery power in the event of an emergency where household electric power is not available.

Figure 1:
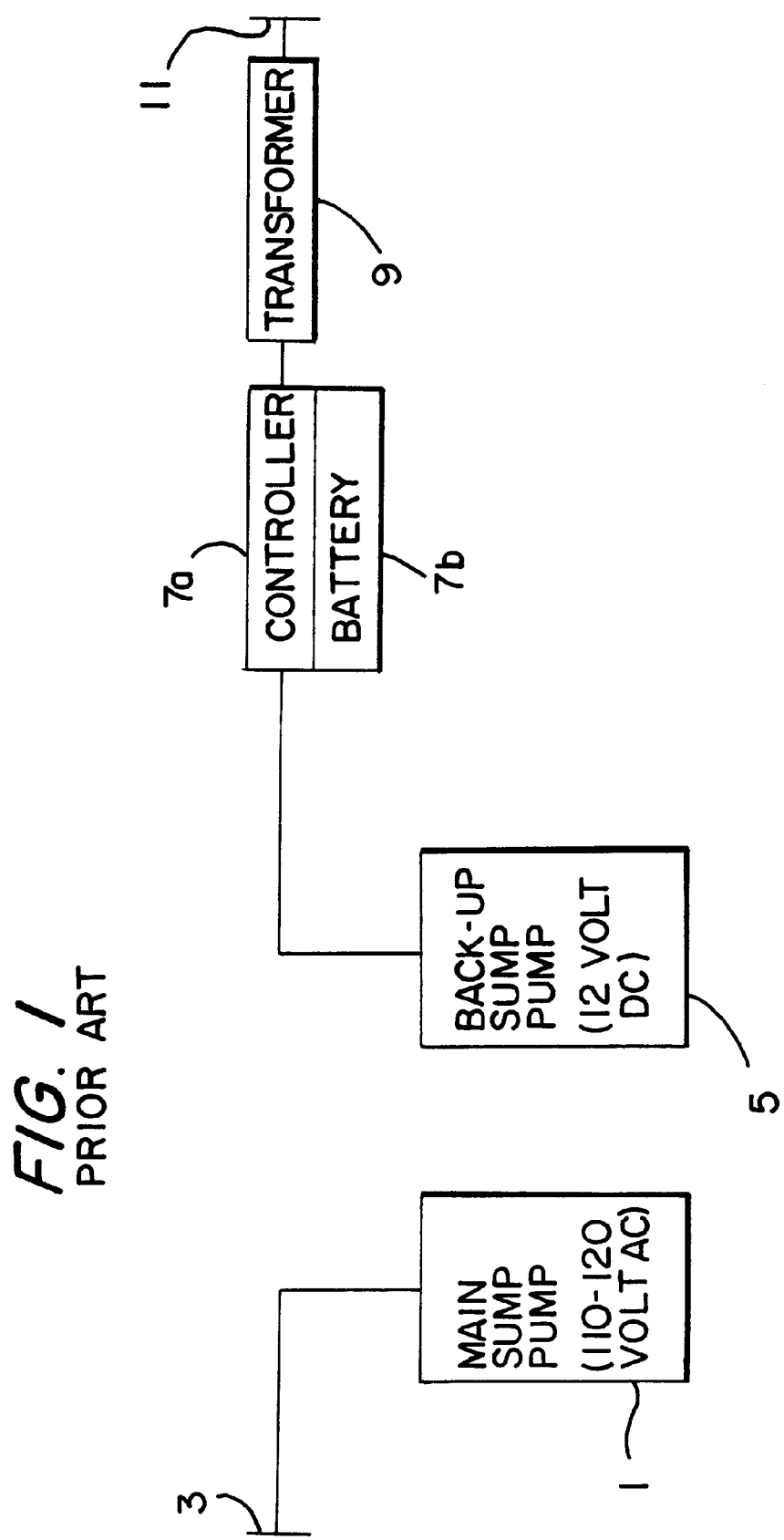
FIG. 1 is a schematic diagram of a prior art 12 volt pump power supply system.
Figure 2:
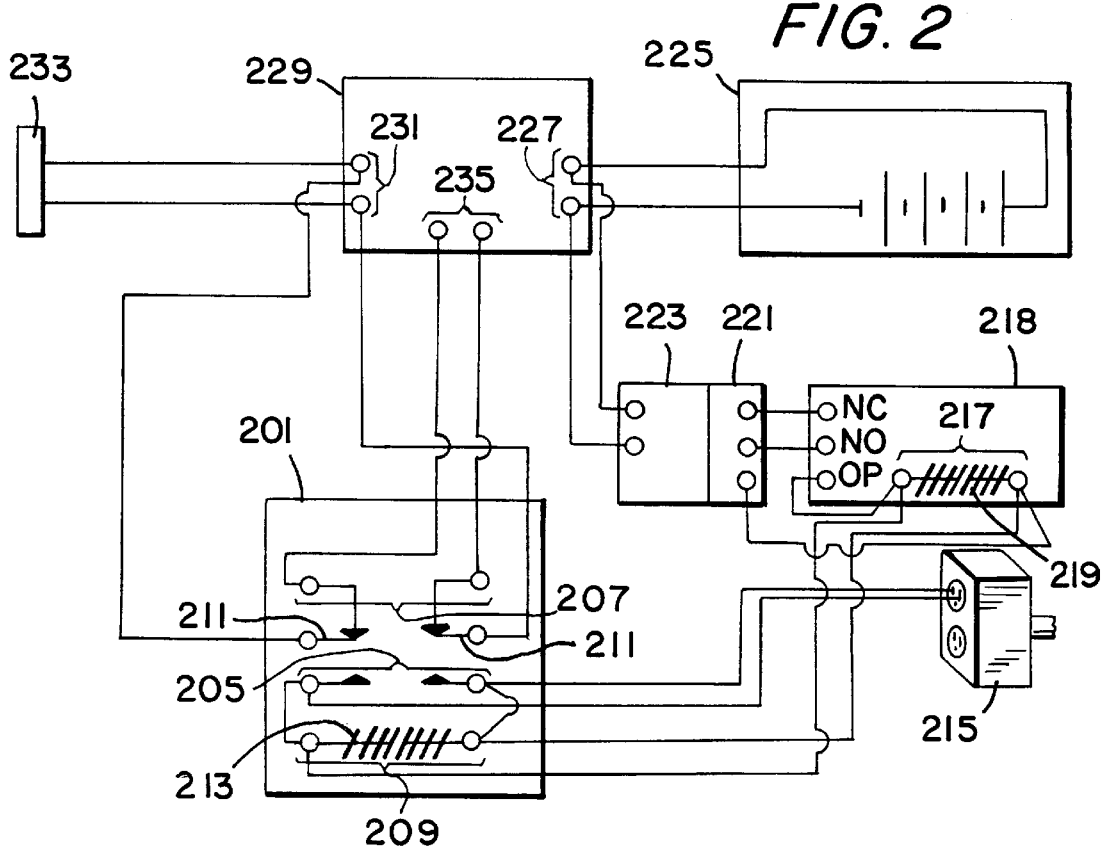
FIG. 2 is a schematic diagram of an embodiment of the instant invention.

Referring now to FIG. 2, the conversion relay 201 of the instant invention includes first input contacts 205, second input contacts 207, output contacts 209, and moveable contacts 211. As explained in more detail below, pick coil 213 controls moveable contacts 211 to contact first input contacts 205 in response to the presence of power at first input contacts 205. Moveable contacts 211 are biased away from first input contacts 205 so that in the absence of power at first input contacts 205, that is, when the pick coil 213 is not activated, moveable contacts 211 contact second input contacts 207.

First input contacts 205 are connected to a source of electricity at wall outlet 215 and output contacts 209 are connected to terminals 217 of timer 218. Pick coil 219 of timer 218 is used to initiate timer circuitry (not shown) within timer 218 when power is present at terminals 217. Terminals NC, NO, and OP of timer 218 provide power and control signals to transformer 221. Transformer 221 in turn provides power to charging system 223 which is adapted to charge battery bank 225 with DC current through terminals 227 of inverter circuit 229.

With respect to conversion relay 201, when power is applied to first input contacts 205 from wall outlet 215, causing pick coil 213 to draw moveable contacts 211 into contact with first input contacts 205, power flows from first input contacts 205 through moveable contacts 211 into main output contacts 231. From main output contacts 231 the power flows to AC receptacle 233, as well as to any appliance connected thereto. In a preferred embodiment of the invention, a 110–120 volt pump is connected to AC receptacle 233.

During this state when pick coil 213 draws moveable contacts 211 into contact with first input contacts 205 power also flows from the output contacts 209 to the timer 218, the transformer 221, the charging system 223, the terminals 227, and the battery bank 225 to charge the battery bank as described above.

In contrast, when there is no power applied to first input contacts 205 from wall outlet 215 the pick coil 213 is not activated and the moveable contacts 211, which are biased away from first input contacts 205, contact second input contacts 207. In this state, which can occur during a power failure, for example, the inverter circuit 229 inverts DC power from battery bank 225 (supplied through terminals 227) into AC power and supplies the inverted AC power to AC receptacle 233 via inverter circuit output terminals 235, second input contacts 207, moveable contacts 211, and main output terminals 231.

Timer 218 may shunt power to transformer 221 from one primary winding to another primary winding with a lesser output after a predetermined time period has elapsed from the signaling by the pick coil 217 that power is being applied thereto. Also, timer 218 may be used to control a cooling fan (not shown).

Figure 5:
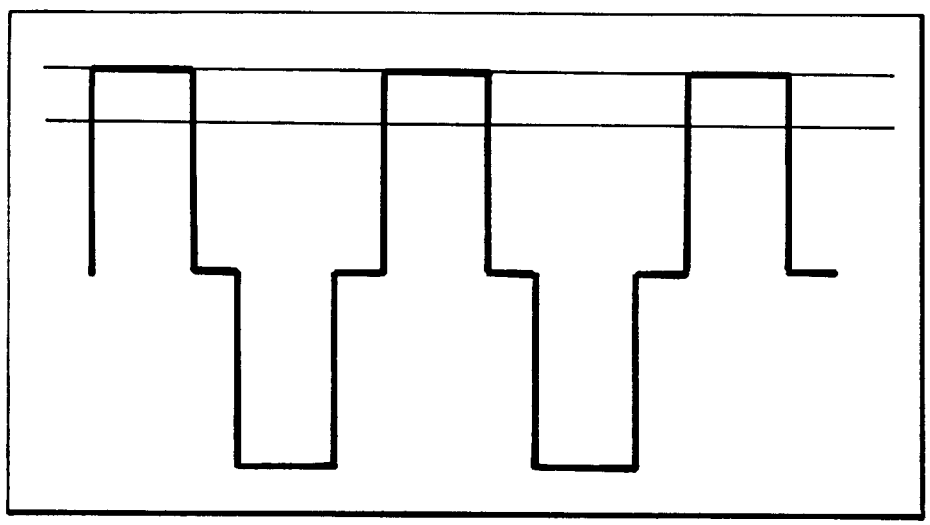
FIG. 5 is a graph showing the output of the inverter circuit of the embodiment of FIG. 2.

It is noted that the inverter circuit 229 is preferably a transformerless circuit employing a number of power MOSFET transistors in a full bridge configuration. This maximizes the efficiency of the instant invention. The output waveform of the inverter circuit 229 is a modified sine wave, as shown in FIG. 5.

Figure 3:
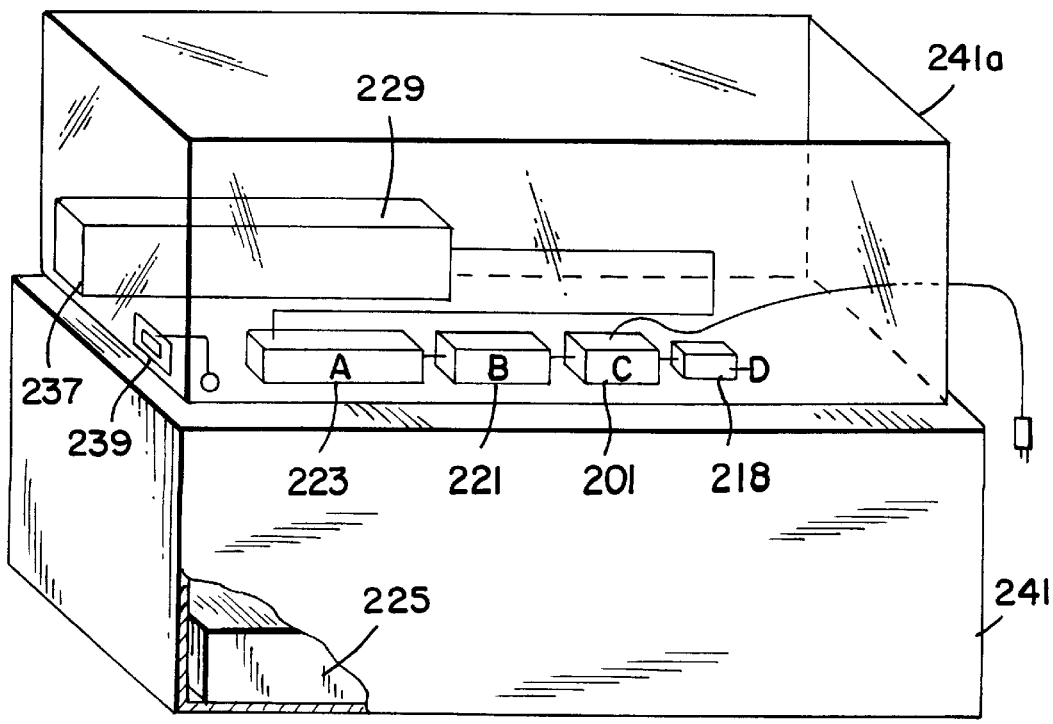
FIG. 3 is a block diagram of the embodiment of FIG. 2.
Figure 4:
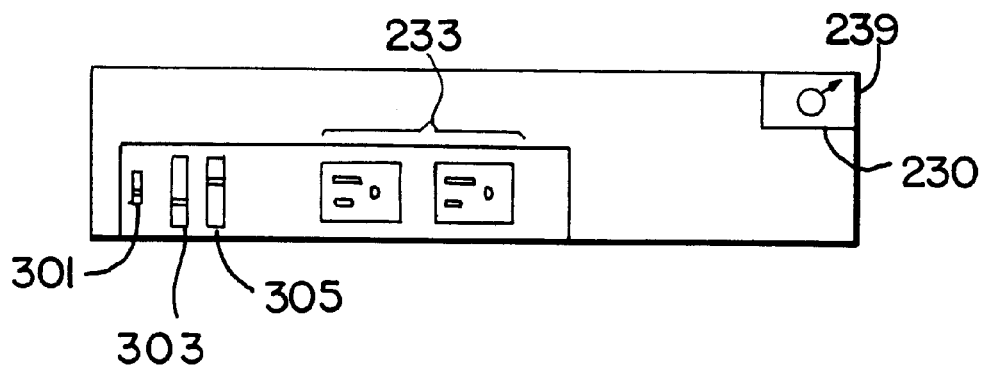
FIG. 4 is a diagram showing diagnostic/control banks of the embodiment of FIG. 2.

Turning now to FIG. 3, a block diagram in which elements of FIG. 2 are shown with the same reference numerals, it is seen that the instant invention may include diagnostic/control banks 237 and 239. These diagnostic/control banks 237 and 239 are shown more clearly in FIG. 4, which shows that diagnostic/control bank 239 may include an ammeter 230 for showing the charge of the battery bank 225 (in amps). FIG. 4 further shows that diagnostic/control bank 237 may include an on/off switch 301 for controlling the entire unit, a battery condition meter 303 for measuring the condition of the battery bank 225 (in volts), and ammeter 305 for indicating the number of amps being drawn from the inverter circuit 229. Diagnostic/control bank 237 may also include AC power receptacle 233.

Referring again to FIG. 3, the top section of the enclosure 241a, which houses the electronic circuits, and the bottom section of the enclosure 241b, which houses the battery bank, may preferable be formed of a non-conducting material, such as plastic.

In a preferred embodiment of the invention the inverter circuit may be either the PROWATT 2500/12 volt power inverter or the PROWATT 1500/12 volt power inverter, both produced by Statpower Technologies Corporation of Burnaby, B.C. Alternatively, the inverter circuit may be the PC1500HS produced by Power-To-Go of Boonton, N.J. The charging system of the instant invention may preferably be the SS-51A-PE battery charger produced by Schumacher Electric Corp. of Chicago, Ill.

Although the present invention is described by reference to particular embodiments thereof, many changes and modifications of the invention may become apparent to those skilled in the art without departing from the spirit and scope of the invention, which is only limited by the appended claims. For example, inverter circuits and charging systems other than those listed above may be used. Moreover, the invention may be used to supply power to another device besides a sump pump, for example, a boiler, a refrigerator, or another appliance or tool. Therefore, the embodiments shown and described are only illustrative, not restrictive.

What is claimed is:

1. A system for selectively providing alternating current power to a pump from an electric utility connection and from a battery, comprising:

means for receiving power from the electric utility connection;

charging means connected to the battery and the means for receiving power for charging the battery with power from the electric utility connection and for maintaining the battery in a fully charged state;

an inverter circuit connected to the battery for outputting alternating current at an inverter output;

said inverter circuit being a transformerless circuit including a plurality of power MOSFET transistors;

a conversion relay connected to the inverter output and the electric utility connection for supplying power to the pump from one of the inverter circuit and the electric utility connection to a main output, said conversion relay including first input contacts, second input contacts, output contacts and movable contacts; and a coil positioned in said conversion relay for drawing the movable contacts into contact with the first input contacts only when power is applied to the first input contacts from the electric utility connection.

2. The system of claim 1, wherein the plurality of power MOSFET transistors are in a full bridge configuration.

3. The system of claim 1, wherein the alternating current power output by the inverter circuit has a period of about 60 Hz, an RMS voltage of about 115 volts RMS, and a peak-to-peak voltage of about 145 volts.

4. The system of claim 1, wherein the alternating current output at the inverter output of the inverter circuit is a modified sine wave.

5. The system of claim 1, wherein the charging means provides power to the battery at about 12 volts and maintains the battery in the fully charged state without overcharging.

6. The system of claim 5, wherein the charging means provides power to the battery at a peak current of about 10 amps and monitors the battery to maintain the fully charged state by applying power thereto.

7. The system of claim 1, wherein the main output includes at least one AC receptacle.

8. The system of claim 1, further comprising at least one of a battery condition meter to indicate the present voltage of the battery, a first ammeter to indicate the present current draw from the inverter output, and a second ammeter to indicate the present current draw by the battery from the charging means.

9. The system of claim 1, further comprising an enclosure formed from a material that is substantially non-conductive.

10. The system of claim 9, wherein the enclosure is formed from plastic.

11. A system for selectively providing alternating current power from an electric utility connection and from a battery, comprising:

charging means connected to the battery and the electric utility connection for charging the battery with power from the electric utility connection and for maintaining the battery in a fully charged state;

an inverter circuit connected to the battery for outputting alternating current at an inverter output;

said inverter circuit being a transformerless circuit including a plurality of power MOSPET transistors;

a conversion relay connected to the inverter output and the electric utility connection for supplying power from one of the inverter circuit and the electric utility connection to a main output, said conversion relay including first input contacts, second input contacts, output contacts and movable contacts; and a coil positioned in said conversion relay for drawing the movable contacts into contact with the first input contacts only when power is applied to the first input contacts from the electric utility connection.

12. The system of claim 4, wherein the plurality of power MOSFET transistors are in a full bridge configuration.

13. The system of claim 11, wherein the alternating current power output by the inverter circuit has a period of about 60 Hz, an RMS voltage of about 115 volts RMS, and a peak-to-peak voltage of about 145 volts.

14. The system of claim 11, wherein the alternating current output at the inverter output of the inverter circuit is a modified sine wave.

15. The system of claim 11, wherein the charging means provides power to the battery at about 12 volts and maintains the battery in the fully charged state without overcharging.

16. The system of claim 15, wherein the charging means provides power to the battery at a peak current of about 10 amps and monitors the battery to maintain the fully charged state by applying power thereto.

17. The system of claim 11, wherein the main output includes at least one AC receptacle.

18. The system of claim 11, further comprising at least one of a battery condition meter to indicate the present voltage of the battery, a first ammeter to indicate the present current draw from the inverter output, and a second ammeter to indicate the present current draw by the battery from the charging means.

19. The system of claim 11, further comprising an enclosure formed from a material that is substantially non-conductive.

20. The system of claim 11, wherein the enclosure is formed from plastic.

21. A method for selectively providing alternating current power from an electric utility connection and from a battery, comprising:

receiving power from the electric utility connection;

charging the battery with power from the electric utility connection without overcharging;

inverting the power from the battery with a transformerless inverter circuit including a plurality of power MOSFET transistors and outputting alternating current at an inverter output of the inverter circuit;

supplying power from one of the inverter circuit and the electric utility connection to a main output via a conversion relay connected to the inverter output and the electric utility connection, said conversion relay including first input contacts, second input contacts, output contacts and movable contacts; and drawing, by using a coil positioned in said conversion relay, the movable contacts into contact with the first input contacts only when power is applied to the first input contacts from the electric utility connection.

* * * * *